United States Patent [19]

Marrin et al.

[11] Patent Number: 5,070,665
[45] Date of Patent: Dec. 10, 1991

[54] CHILD'S PLAY PANEL

[75] Inventors: Stuart A. Marrin; William E. Pastrick, both of Manitoba, Canada

[73] Assignee: Adamen Inc., Winnipeg, Canada

[21] Appl. No.: 384,439

[22] Filed: Jul. 25, 1989

[51] Int. Cl.$^5$ .................. A63H 33/08; E06B 9/24; E04B 1/343; E04H 1/12

[52] U.S. Cl. .................................. 52/239; 52/64; 52/71; 52/127.6; 52/586; 160/135; 160/351; 160/352; 160/377; 160/378; 211/182; 446/108; 446/901

[58] Field of Search ............... 52/71, DIG. 13, 586, 52/64, 127.6, 239; 160/135, 351, 352, 377, 378; 272/65, 113; 135/99; 446/108-112, 115, 85, 116, 176, 178, 901; 211/182, 176-178; 40/605

[56] References Cited

U.S. PATENT DOCUMENTS

| | | | |
|---|---|---|---|
| 219,080 | 9/1879 | Edwards | 272/65 |
| 1,398,852 | 11/1921 | Gilbert | 446/112 |
| 1,522,644 | 1/1925 | Munson | 135/99 |
| 2,274,165 | 2/1942 | Ritzau | 211/182 X |
| 2,335,274 | 11/1943 | Hampton | 160/135 |
| 2,532,837 | 12/1950 | De Puy | 160/377 |
| 2,645,540 | 7/1953 | Trimble | 160/378 |
| 3,428,188 | 2/1969 | Boudreau et al. | 211/182 X |
| 3,619,935 | 11/1971 | Gregoire | 446/115 |
| 3,752,472 | 8/1973 | Snead | 272/113 |
| 3,767,009 | 10/1973 | Sidlinger | 272/65 |
| 3,827,177 | 8/1974 | Wengel | 446/112 |
| 3,977,528 | 8/1976 | Berger | 211/182 |
| 4,021,973 | 5/1977 | Hegg | 160/351 |
| 4,047,337 | 9/1977 | Bergstrom | 160/351 |
| 4,055,019 | 10/1977 | Harvey | 446/115 |
| 4,134,439 | 1/1979 | Scott | 160/351 |
| 4,388,786 | 6/1983 | Gassler | 52/282 |
| 4,426,816 | 1/1984 | Dean | 52/DIG. 13 |
| 4,493,172 | 1/1985 | Jones | 52/282 |
| 4,516,620 | 5/1985 | Mulhern | 160/351 |
| 4,763,798 | 8/1988 | Handler | 403/24 X |
| 4,770,292 | 9/1988 | Handler | 248/205.2 X |
| 4,774,792 | 10/1988 | Ballance | 52/239 X |
| 4,785,565 | 11/1988 | Kuffner | 160/135 |
| 4,842,035 | 1/1989 | Thompson | 160/135 |
| 4,879,854 | 11/1989 | Handler | 52/71 X |
| 4,884,988 | 12/1989 | McMurray | 52/DIG. 13 X |

FOREIGN PATENT DOCUMENTS

| | | | |
|---|---|---|---|
| 1051474 | 3/1979 | Canada | 272/65 |
| 627583 | 3/1936 | Fed. Rep. of Germany | 160/377 |
| 371740 | 2/1974 | Sweden | 160/351 |
| 2081338 | 8/1980 | United Kingdom | 160/351 |
| 2082925 | 9/1980 | United Kingdom | 446/901 |

*Primary Examiner*—John E. Murtagh
*Assistant Examiner*—Deborah McGann Ripley
*Attorney, Agent, or Firm*—Adrian D. Battison; Stanley G. Ade; Murray E. Thrift

[57] ABSTRACT

A play panel for use by children in building construction such as playhouses or mazes within which the child can play comprises a surrounding frame structure defined by four frame elements each of which includes one side portion and one corner portion of the total frame structure. A fabric cover for spanning the frame has sleeves defined along four sides each for receiving one side portion of a frame element. The frame elements are connected together by coupling members which are in the form of sleeves surrounding the frame elements as a press fit. Each coupling member has on its outer cylindrical surface a plurality of fins with each fin having a wider rib along the outermost edge. The coupling members of one panel can be connected to the coupling members of the next panel by forcing the fins of one into the spaces of the fins of the other. The ribs are shaped to hold the coupling members together with a release force which is greater than the insertion force to allow a hinging action of one panel around an axis defined by the other panel.

21 Claims, 2 Drawing Sheets

CHILD'S PLAY PANEL

BACKGROUND OF THE INVENTION

This invention relates to a panel for use by children which can be connected to a number of adjacent panels to form playhouses, mazes and other constructions large enough for children to physically play within.

Various designs of play panels for children are available which comprises substantially flat panel often formed by molding from plastics material which is then connected to adjacent panels generally using elements which are separate from the panels and snap fasten the panels together.

A number of problems arise with conventional designs of this type. Firstly large plastic panels are difficult to package so that they are large and cumbersome both in storage and in transportation. Large panels of this type tend to be relatively heavy so that complete construction is relatively massive.

Separate coupling elements are very undesirable in that they can readily become lost. Often the coupling elements enable the panels to be connected only in limited orientations and in many cases it is not possible to connect more than two panels together at the same point so that it is difficult or impossible to connect for example three walls joined together at a corner.

Examples of panels of this type are shown in U.S. Pat. No. 1,398,852 (Gilbert) and U.S. Pat. No. 3,827,177 (Wengel). Further construction elements for children's toys are shown in U.S. Pat. No. 3,619,935 (Gregoire) and U.S. Pat. No. 4,055,019 (Harvey). These patents do not show constructions of panels which overcome the problems outlined above.

SUMMARY OF THE INVENTION

It is one object of the present invention to provide a panel construction for use by children which is simple and inexpensive to manufacture.

It is another object of the present invention to provide a panel of this type which is collapsible so that it is formed from a number of lightweight parts.

It is a further object of the present invention to provide a panel which has connectors for joining one panel to the next which allow the panels to be connected together at various different orientations and to allow more than one panel to be connected to a first at the connectors of the first.

It is a yet further object of the present invention to provide a panel of this type in which the connectors allow rotation of one panel relative to a next panel with the connectors providing and defining the hinged coupling without the necessity for any moving or rotating parts of the coupling.

According to the first aspect of the invention therefore there is provided a panel construction for use as a child's toy comprising a peripheral frame structure having four sides, four corners each connecting two sides generally at right angles such that the sides and corners define a complete frame surrounding a hollow central opening, at least two of the sides having connector means mounted thereon arranged for coupling to a cooperating connector means of an adjacent panel and a fabric layer connected to the frame structure so as to span the hollow central opening.

According to a second aspect of the invention therefore there is provided a panel construction for use as a child's toy comprising a frame structure having sides, and means spanning the frame structure to form a substantially flat panel body, at least two of the sides each having a first connector means mounted thereon arranged for coupling to second connector means of an adjacent panel each connector means comprising an inner support body defining an axis longitudinal thereof, a plurality of fins supported by and extending outwardly from the support body, each of the fins lying in a plane radial to the axis and each of the fins having a rib portion extending longitudinally of the fin at a position spaced outwardly of the support body and projecting outwardly to sides of the fin so as to provide an area of reduced spacing between the fin and the next adjacent fin, the spacing being such that a rib portion of said second connector means can be pressed between the adjacent rib portions of two fins of the first connector means and is retained therebetween to hold the first and second connector means together.

With the foregoing in view, and other advantages as will become apparent to those skilled in the art to which this invention relates as this specification proceeds, a description of the preferred typical embodiment of the principles of the present invention, is herein described.

DESCRIPTION OF THE DRAWINGS

In the drawings like characters of reference indicate corresponding parts in the different figures.

DETAILED DESCRIPTION

Figure 1:
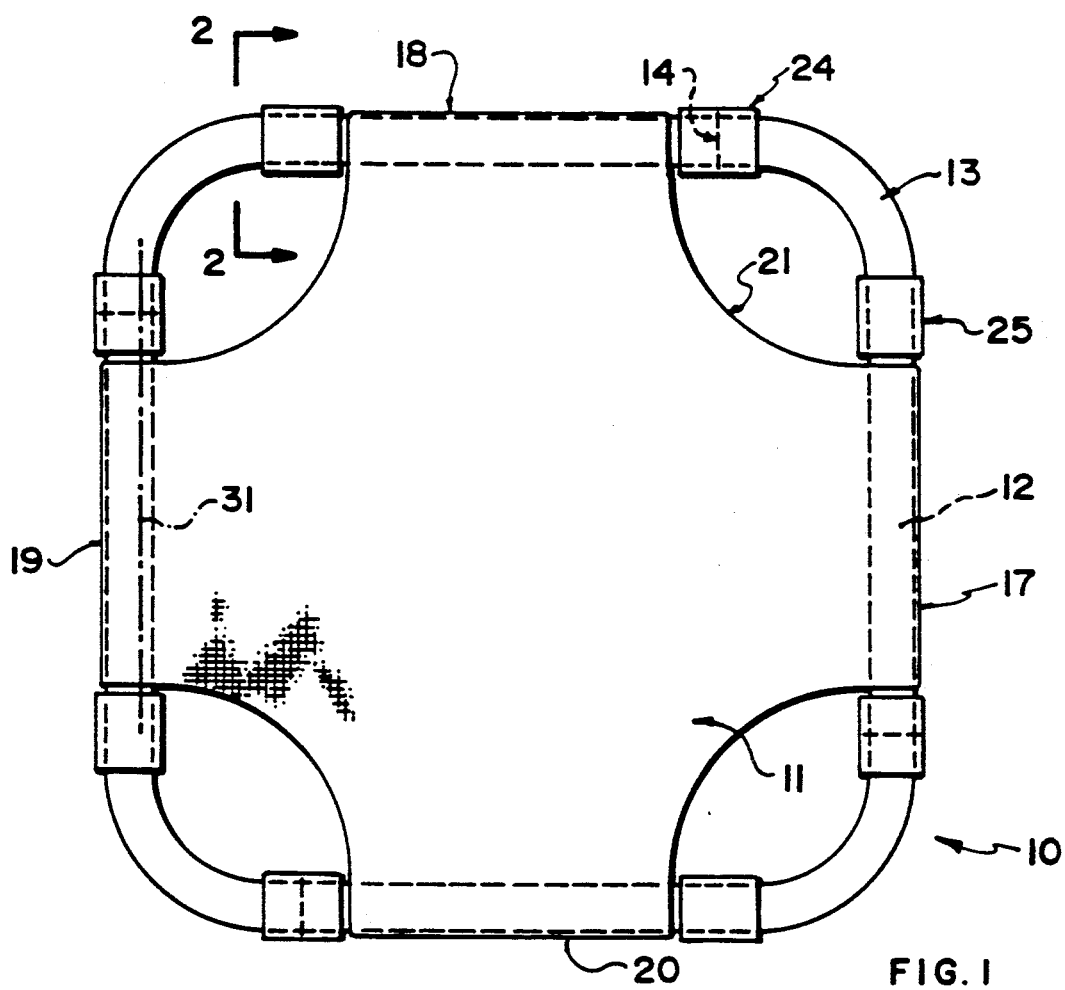
FIG. 1 is a plan view of a child's play panel according to the invention.
Figure 2:
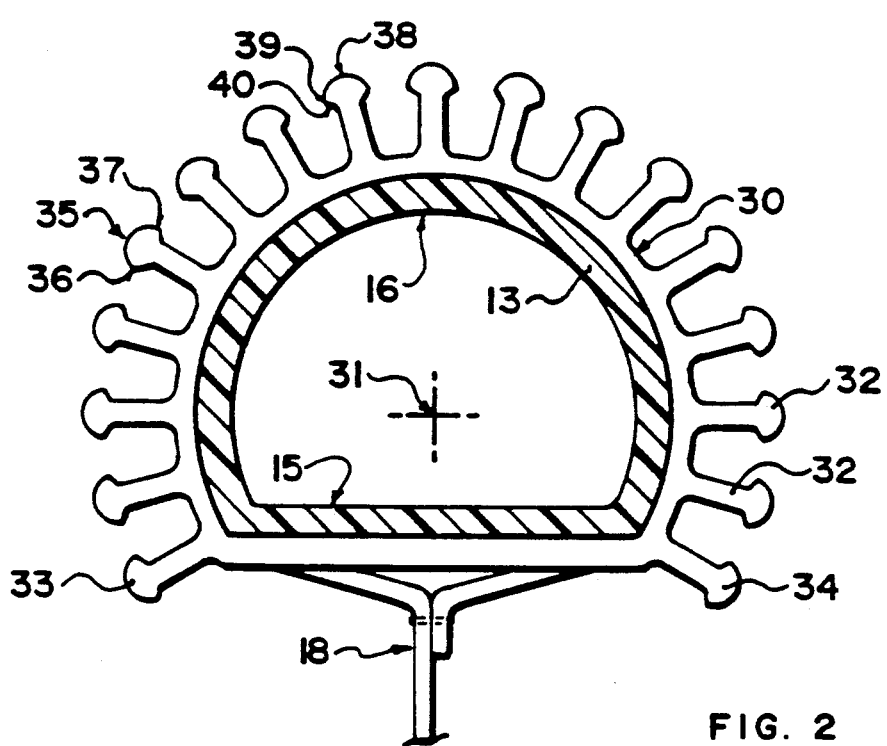
FIG. 2 is a cross-sectional view along the lines 2—2 of FIG. 1 showing a connector in very much enlarged scale.

The play panel shown in FIG. 1 comprises an outer frame structure 10 which is formed by four separate frame elements connected together to form a generally rectangular outer frame. Spanning the outer frame is a fabric layer 11. The four elements of the frame are identical and each comprises a substantially straight side portion 12 and a corner portion 13 which is smoothly curved and is integral with the side portion 12. The end of the curved corner portion remote from the side portion 12 is arranged to abutt end to end as indicated at 14 with the side portion of the next adjacent element. The elements are formed from a tubular extrusion which is D-shaped as indicated in FIG. 2. This defines a flat side 15 and a curved arch section 16.

The fabric layer 11 is sewn to define sleeves along four sides 17, 18, 19 and 20 with each sleeve wrapping around and cooperating with a respective one of the side portions 12 of the frame elements. From the end of the sleeve, the fabric is smoothly curved inwardly as indicated at 21 to connect that end of the sleeve to the adjacent end of the next adjacent sleeve. Thus the corner portions 13 are exposed. The fabric is sewn along the curved edges 21 to prevent fraying so that the fabric can be removed, washed and replaced simply by sliding the side portions of the frame elements out of the sleeves to release the fabric.

Figure 3:
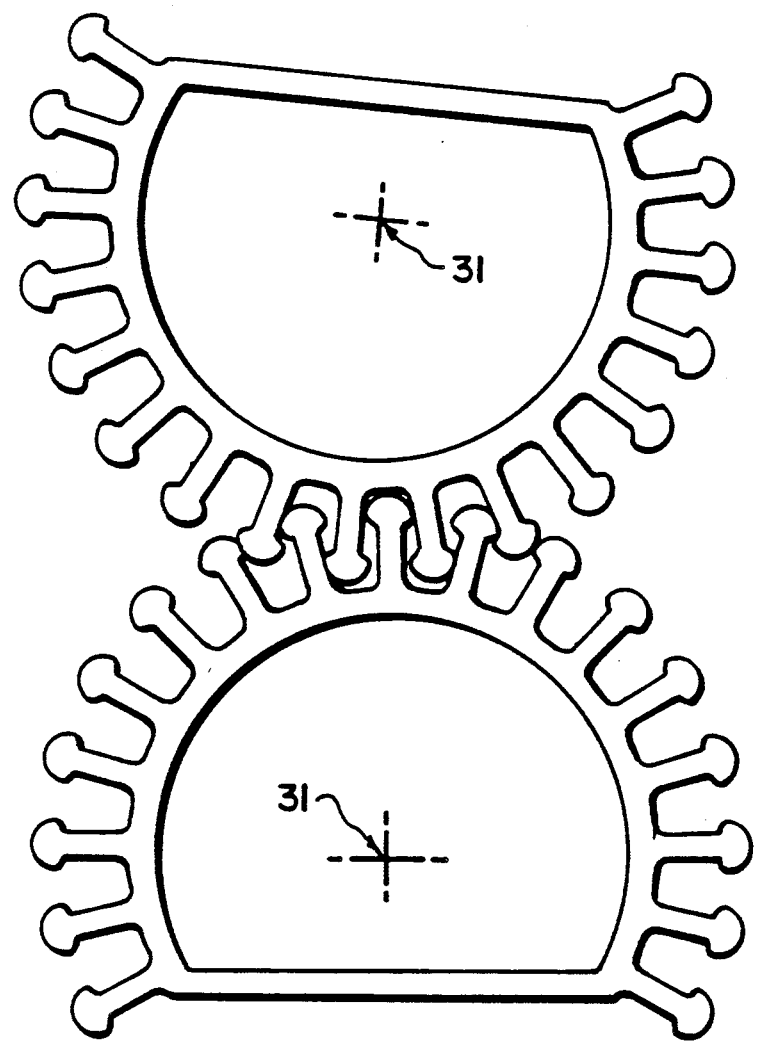
FIG. 3 is an end view of a connector of one panel which is cooperating with a connector of a next adjacent panel in a coupling action.

Each of the frame elements carries two connectors shown in more detail in FIGS. 2 and 3 for connection to an adjacent panel. Thus the element shown in the top right hand corner of the frame of FIG. 1 carries a connector 24 and a connector 25. Each of the connectors forms a sleeve which has an internal cross-section equal to the external cross-section of the frame element so that it is D-shaped as shown in FIG. 2. The sleeve shaped coupling member can thus be slid along the outer surface of the extrusion forming the element. The coupling member 25 is thus slid from the unattached end of the side portion 12 to a position intermediate the corner portion 13 and the side portion 12. The coupling member can be fastened at that position by adhesive so that it is permanently located. The coupling member 24 can be slid into position over the unattached end of the corner portion 13 so that the end of the corner portion reaches only half way into the coupling member 24. Thus the line 14 which is the abutting line between the end of the corner portion and the end of the side portion of the next adjacent element occurs inside the coupling member. In this way the coupling member holds the abutting ends together. The coupling member can be fastened to the end of the corner portion 13 by adhesive so that it remains permanently in position. The end of the side portion of the next adjacent element can thus be merely slid into the interior of the fixed coupling member 24 and can be removed again for collapsing of the frame.

It will be noted that the free end of the side portion 12 carries no coupling member so the free end can be simply inserted through the sleeve formed at the edge of the fabric and then mounted in position within the coupling member. In this way the frame structure can be assembled and collapsed and the fabric applied and removed without difficulty for storage of the panels or for washing of the fabric. The elements forming the frame are all identical, there are only four pieces forming the frame and there are no separate connecting pieces which can be lost or damaged.

Turning now to the details of the coupling member, as best shown in FIGS. 2 and 3, the coupling members are all identical and it will be noted that each side of the panel has two such coupling members spaced apart at opposite ends of the side portion.

The coupling member comprises an inner body portion 30 which is shaped to directly surround the outer surface of the frame element and thus is D-shaped in cross section as previously described. The inner body 30 is smoothly curved around an axis 31 so that the inner body forms a cylindrical surface about the axis 31. Projecting outwardly from the outer surface of the inner body 30 is a plurality of fins 32 each of which lies in a radial plane around the axis 31. The fins commence at a fin 33 and extend around the full periphery to a final fin 34. The fins 33 and 34 are at the extremities of the curved portion of the inner body 30 with the fins being omitted from the flat portion of the inner body 30. The angular extent from the fin 33 to the fin 34 is at least 180° and preferably larger.

The ribs thus lie on an imaginary cylinder surrounding the axis 31. Each fin has at an upper end a rib 35 which extends along the full length of the fin and projects outwardly to each side of the fin as indicated at 36 and 37. Each of the ribs is smoothly curved around the outermost part of the fin from an outermost end 38 of the fin to a widest part 39 of the rib. A surface 40 connects from the widest part of the rib to the fin itself which is of course narrower than the rib. The surface 40 is at an angle which is sharper than the angle of the curved surface of the rib relative to a plane parallel to the adjacent side of the fin.

The coupling between two of the connecting members is shown in FIG. 3. In this coupling action, the connecting members are placed into contact with the axes 31 thereof parallel. The coupling members are then pushed together so that the fins of one of the members enter the spaces between the fins of the other of the members. In order for this to occur, the smoothly curved outer surfaces of the ribs come into contact and then push past one another so that the rib enters the area between one fin and the next adjacent fin. It will be appreciated that the spacing between the ribs is selected so that it is slightly less than the width of a rib so that it is necessary for some distortion of the ribs to occur for this entry of the rib into the space to take place.

The depth of the fins is such that at least two and preferably three of the ribs can be inserted into the spaces between the ribs of the other coupling element.

Once the ribs are inserted into the space between the fins of the other coupling member, in order for the ribs to be removed, it is necessary for the coupling members to be pulled apart at which time the surfaces 40 of the ribs come into contact. As the angle of the surfaces 40 is sharper than the angle of the surface of the ribs on the outer side of the widest point 39, the force necessary to pull the rib out of the space between the two fins is greater than the force necessary to insert the rib into the space between the two fins. This helps to keep the coupling members connected together so they tend to remain connected after the panels have been attached.

In addition it will be noted from FIG. 3 that if the upper one of the coupling members is rotated about the axis 31 of the lower one of the coupling members, the ribs on the right hand side will tend to be inserted into the spaces between the fins on that side of the lower coupling member while the ribs on the left hand side are pulled out of the spaces. As the force necessary to press the ribs into place is less than the force necessary to pull the ribs out of place, the coupling members tend to remain connected while the rotation takes place. This provides a hinging action allowing the upper one of the coupling members to rotate about the axis of the lower one or vice versa. Thus in the absence of any force tending to pull the coupling members apart, the coupling members will freely rotate as described above and will remain connected.

As it will be apparent from FIG. 3, it is also possible for further coupling members to be connected to the lower coupling member on the sides remote from the upper coupling member. Thus for example four walls joining at a single corner can be all connected together by inserting two more coupling members, one on the left hand side and one on the right hand side interconnecting with both the upper and lower coupling members of FIG. 3.

If required the coupling members can simply be pulled apart by applying sufficient force in an outward direction to cause the undersurfaces of the ribs to snap over one another thus releasing the coupling members.

The unique construction of the coupling members enables the panels to be connected together at different orientations and with many panels connected at the same corner. The rotation which is also possible allows one of the panels to act for example as a doorway in a pivotal opening and closing action. The use of the connecting members for both coupling one panel to the next and for joining the elements of the frame into the total frame structure enables the panels to be manufactured simply and inexpensively with no loose parts which can be lost or damaged.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A panel construction for use as a child's toy comprising a peripheral frame structure having four frame sides and four frame corners each connecting two frame sides generally at right angles such that the frame sides and frame corners define a complete frame surrounding a hollow central opening, a plurality of connector means, each mounted on a respective one of the frame sides and each including means extending outwardly to one side of a longitudinal axis of the frame side arranged for direct engagement with and coupling to a cooperating connector means on a frame side of an adjacent panel, all of the connector means being of identical construction such that each can directly connect in a readily releasable arrangement to any other one of the connector means, each of said four frame sides having a connector means mounted thereon, and a fabric layer connected to each side of the frame structure so as to span the hollow central opening, wherein each connector means comprises an inner support body defining an axis longitudinal of one frame side and extending along a portion of the frame side a plurality of planar fins supported by and extending outwardly from the support body and extending longitudinally along the support body, each of the fins lying in a plane radial to the axis and each of the fins having a rib member extending longitudinally of the fin parallel to the axis at a position spaced outwardly of the support body and having a portion projecting outwardly to respective sides of the fin so as to provide an area of reduced spacing between each side the fin and the adjacent side of the next adjacent fin, the spacing being such that a rib member of either one of said connector means can be pressed between the adjacent rib members of two fins of the other of the connector means and is retained therebetween to hold the connector means directly connected together.

2. The invention according to claim 1 wherein said frame structure comprises a plurality of separate frame elements with each frame element being connected to a next adjacent frame element by a respective one of said connector means.

3. The invention according to claim 2 wherein the connector means comprises a sleeve arranged to receive end portions of two adjacent frame element to hold the end portions in end to end abutting relationship.

4. The invention according to claim 2 wherein the frame structure is formed in four separate frame elements each frame element being formed integrally of only one frame side and one frame corner.

5. The invention according to claim 4 wherein each of the separate frame elements has mounted thereon two connector means, one of said connector means being mounted at a position partway along the frame element and the other connector means being arranged at one end of the frame element.

6. The invention according to claim 5 wherein each frame element has one connector means arranged at a position between the frame side and the frame corner thereof and the second connector means arranged at the end of the frame corner remote from the frame side leaving the other end of the frame side open for insertion into the connector means of the next adjacent element.

7. The invention according to claim 6 wherein the fabric layer includes four edges with each edge having a sleeve therealong each sleeve being arranged to receive said other end of said frame side of a respective one of said frame elements at the sliding fit therealong such that the frame side can be inserted into the sleeve, the fabric being formed to extend diagonally from each sleeve to the next adjacent sleeve leaving the corner of the frame element and the connector means exposed.

8. The invention according to claim 1 wherein the fabric layer has four edges each having a sleeve therealong for receiving a side of the frame structure, the fabric being formed to extend diagonally from each sleeve to the next adjacent sleeve leaving the corner of the frame structure exposed. leaving the corner of the frame exposed.

9. The invention according to claim 1 wherein the frame structure is formed from extruded material which is D-shaped in cross section.

10. The invention according to claim 9 wherein each connector means comprises a sleeve which has an internal cross-section identical to the cross-section of the frame element so that the connector is prevented from rotation relative to the frame.

11. The invention according to claim 1 wherein the rib members lie on an imaginary cylinder surrounding the axis.

12. The invention according to claim 11 wherein the spacing of the rib member from the inner support body is such that a plurality of fins of the first connector means project into the spaces between a plurality of fins of the second connector means.

13. The invention according to claim 12 wherein at least three fins of each of the first connector means can extend simultaneously into the respective spaces between the fins of the second connector means.

14. The invention according to claim 1 wherein there are sufficient fins such that the angular extent around the inner support body from a radial plane containing an end one of the fins to a radial plane containing an opposed end one of the fins is at least 180°.

15. The invention according to claim 1 wherein the rib member is arranged at an outer edge of the respective fin.

16. The invention according to claim 1 where each of the rib members is shaped so that the force required to press the rib member of the second connector means into the space between two of the fins of the first connector means is less than the force required to pull the rib out of that space so that the second connector means can be caused to rotate around the axis of the first connector means by inserting fins at one portion of the periphery while pulling the fins at an opposed portion of the periphery.

17. The invention according to claim 16 wherein each of the rib member has a smoothly curved outer periphery extending away from the fin and a side coupling the smoothly curved outer periphery to a side of the fin which is arranged at a sharper angle relative to a line parallel to the side of the fin to provide said greater force.

18. A panel construction for use as a child's toy comprising a peripheral frame structure having four frame sides and four frame corners each connecting two frame sides generally at right angles such that the frame sides and frame corners define a complete frame surrounding a hollow central opening, a plurality of connector means, each mounted on a respective one of the frame sides and each including means extending outwardly to one side of a longitudinal axis of the frame side arranged for direct engagement with and coupling to a cooperating connector means on a frame side of an adjacent panel, all of the connector means being of identical construction such that each can directly connect in a readily releasable arrangement to any other one of the connector means, each of said four frame sides having a connector means mounted thereon, and a fabric layer connected to each side of the frame structure so as to span the hollow central opening, said frame structure comprising four separate frame elements each frame element being formed integrally from one frame side and one frame corner, each of the separate frame members having mounted thereon two connector means, one of said connector means being mounted at the position part way along the frame element between the frame side and the frame corner thereof and the second connector means arranged at the end of the frame corner remote from the frame side leaving the other end of the frame side open for insertion into the connector means of the next adjacent element.

19. The invention according to claim 18 wherein the fabric layer includes four edges with each edge having a sleeve therealong each sleeve being arranged to receive said other end of said frame side of a respective one of said frame elements as a sliding fit therealong such that the frame side can be inserted into the sleeve, the fabric being formed to extend diagonally from each sleeve to the next adjacent sleeve leaving the frame corner of the frame element exposed.

20. A panel construction for use as a child's toy comprising a peripheral frame structure having four frame sides and four frame corners each connecting two frame sides generally at right angles such that the frame sides and frame corners define a complete frame surrounding a hollow central opening, a plurality of connector means, each mounted on a respective one of the frame sides and each including means extending outwardly to one side of a longitudinal axis of the frame side arranged for direct engagement with and coupling to a cooperating connector means on a frame side of an adjacent panel, all of the connector means being of identical construction such that each can directly connect in a readily releasable arrangement to any other one of the connector means, each of said four frame sides having a connector means mounted thereon, and a fabric layer connected to each side of the frame structure so as to span the hollow central opening, wherein each connector means comprises an inner support body defining an axis longitudinal of one frame side and extending along a portion of the frame side a plurality of planar fins supported by and extending outwardly from the support body and extending longitudinally along the support body, each of the fins lying in a plane radial to the axis and each of the fins having a rib member extending longitudinally of the fin parallel to the axis at a position spaced outwardly of the support body and having a portion projecting outwardly to respective sides of the fin so as to provide an area of reduced spacing between each side the fin and the adjacent side of the next adjacent fin, the spacing being such that a rib member of either one of said connector means can be pressed between the adjacent rib members of two fins of the other of the connector means and is retained therebetween to hold the connector means directly connected together, each of the rib members being shaped so that the force required to press the rib member of the second connector means into the space between two of the fins of the first connector means is less than the force required to pull the rib member out of that space so that the second connector means can be caused to rotate around the axis of the first connector means by inserting fins at one portion of the periphery while pulling the fins at an opposed portion of the periphery.

21. The invention according to claim 20 wherein each of the rib members has a smoothly curved outer periphery extending away from the fin and a side coupling the smoothly curved outer periphery to a side of the fin which is arranged at a sharper angle relative to a line parallel to the side of the fin to provide said greater force.

* * * * *